US009359267B2

(12) United States Patent
Yu et al.

(10) Patent No.: US 9,359,267 B2
(45) Date of Patent: Jun. 7, 2016

(54) USING BIOCHAR AS CONTAINER SUBSTRATE FOR PLANT GROWTH

(71) Applicants: Fei Yu, Starkville, MS (US); Phillip H. Steele, Starkville, MS (US); Mengmeng Gu, College Station, TX (US); Yan Zhao, Starkville, MS (US)

(72) Inventors: Fei Yu, Starkville, MS (US); Phillip H. Steele, Starkville, MS (US); Mengmeng Gu, College Station, TX (US); Yan Zhao, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 70 days.

(21) Appl. No.: 13/694,276

(22) Filed: Nov. 14, 2012

(65) Prior Publication Data

US 2013/0232869 A1    Sep. 12, 2013

Related U.S. Application Data

(60) Provisional application No. 61/629,148, filed on Nov. 14, 2011.

(51) Int. Cl.
| C05F 11/02 | (2006.01) |
| C05F 11/00 | (2006.01) |
| A01G 1/00 | (2006.01) |
| A01G 9/10 | (2006.01) |

(52) U.S. Cl.
CPC ............... *C05F 11/00* (2013.01); *A01G 1/001* (2013.01); *A01G 9/1086* (2013.01); *C05F 11/02* (2013.01); *Y02P 20/145* (2015.11)

(58) Field of Classification Search
CPC ...... A01G 1/00; A01G 31/001; A01G 9/1086; C05F 11/00; C05F 11/02
USPC ........................................................ 47/58.1 R
See application file for complete search history.

(56) References Cited

U.S. PATENT DOCUMENTS

| 8,197,573 | B2* | 6/2012 | Scharf | 71/31 |
| 8,398,738 | B2* | 3/2013 | Lee et al. | 71/54 |
| 8,573,144 | B2* | 11/2013 | Lewis | 111/174 |
| 2008/0317657 | A1* | 12/2008 | Hall et al. | 423/437.1 |
| 2009/0286295 | A1* | 11/2009 | Medoff et al. | 435/162 |
| 2010/0120128 | A1* | 5/2010 | Liang | 435/266 |
| 2011/0041395 | A1* | 2/2011 | Newbold et al. | 47/1.4 |
| 2011/0042277 | A1* | 2/2011 | Briens et al. | 209/12.1 |
| 2011/0044761 | A1* | 2/2011 | Chang | 405/128.75 |
| 2011/0092726 | A1* | 4/2011 | Clarke | 554/175 |
| 2011/0172092 | A1* | 7/2011 | Lee et al. | 502/416 |
| 2011/0252699 | A1* | 10/2011 | Shepard | 44/605 |
| 2011/0290202 | A1* | 12/2011 | Smith et al. | 123/3 |
| 2013/0312472 | A1* | 11/2013 | Brehmer et al. | 71/24 |

* cited by examiner

*Primary Examiner* — Monica Williams
(74) *Attorney, Agent, or Firm* — Lawrence Arthur Schemmel

(57) ABSTRACT

The present invention provides for novel biochar compositions and a method for producing a new substrate for growing plants using the biochar and a method for growing plants using the biochar composition substrate.

26 Claims, 26 Drawing Sheets

USING BIOCHAR AS CONTAINER SUBSTRATE FOR PLANT GROWTH

CROSS-REFERENCE TO RELATED APPLICATION

This application claims priority from U.S. Provisional Patent Application Ser. No. 61/629,148 filed Nov. 14, 2011. The entirety of that provisional application is incorporated herein by reference.

FIELD OF THE INVENTION

The present invention relates to container substrates for growing plants in greenhouses, nurseries, private homes, and businesses, and to methods of manufacturing and using such substrates. More specifically, the invention provides novel compositions comprising biochar as a substrate for the growth of plants and a novel substrate composed of biochar in variable percentages, by volume, of the substrate. It further provides for a method of making a substrate comprising biochar for the growth of plants and a method of growing potted plants in a composition comprising biochar in the substrate for plant growth.

BACKGROUND OF THE INVENTION

Horticulture container production needs a large volume of potting mixes and is typically short of supplies. Most container substrates are either bark-based or peat moss-based (Wright and Browder, 2005). Bark is relatively inexpensive and is the major substrate component in outdoor nursery production settings. Peat moss is more expensive and the major substrate component in greenhouse production settings. The supply of bark has decreased due to the house market and peat moss harvest has been targeted as the cause of destroying natural bog ecosystems (Robertson, 1993). Along with increased shipping cost, peat moss (shipping from Canada) is getting more and more expensive, which affects growers' profitability. The prices of two major container substrate components, peat moss and perlite, are relatively high in the range of \$3.55-\$6.35/ft$^3$ (Premier Horticulture Inc.) and \$10.95/ft$^3$ (Ace Hardware), respectively. The wholesale price for Sunshine Mix #1, a commonly used greenhouse potting mix including both peat moss and perlite, is \$4.57/ft$^3$ from BWI in Jackson, Miss. It would benefit the green industry to have access to cheaper alternatives with similar physical and chemical properties.

Research activities currently ongoing are searching for alternative substrates including WholeTree, Woodgro, clean chip residual and switchgrass-based substrate (Fain et al., 2008; Wright et al., 2008; Boyer et al., 2008; Altland and Frantz, 2009). However, these alternative substrates have limitations including, but not limited to, additional input of fertilizers and/or other amendments, and/or limitations on the percentage that the alternative substrate can be incorporated in the container. In addition, another possible disadvantage of the wood-based or biomass-based alternative substrates is their potential shrinkage during plant production, especially for plants that require a long production cycle, due to decomposition of organic matters through the action of living organisms in these alternative materials.

Many research activities have also been focused on the use of industrial and agriculture waste, such as cotton gin compost (Papfotiou et al., 2007), kenaf and coconut coir pith (Goyne and Arnold, 1996), and biosolids and animal manure (Krucker et al., 2010). Although some of these alternative substrate components have had some positive aspects and could be amended to conventional substrate components, their widespread use in the horticulture industry is often limited by their limited supply of consistent quality product.

The search for alternative container substrate continues, especially for one that is relatively inexpensive, available in an abundant quantity and with little or no environmental impact, and that can be used as the sole component or major component of the container substrate. The present invention provides such a composition and method for making a substrate comprising biochar.

U.S. Patent Application Publ. No. US2011/0172092 (Lee, et al., application Ser. No. 12/686,831) involves a method for producing an oxygenated biochar material having a cation-exchanging property such that the biochar source acquires oxygen-containing cation-exchanging groups in an incomplete combustion process. The method of that application utilizes biochar in the ground as in-ground soil amendment. The present invention utilizes a novel biochar composition in containers as high value growing substrate (potting mixes). The application site of the biochar of the present invention uses a container or containers which could be composed of, but not limited to, a pot, box, bag, bucket, basket, tray, enclosed planting bed, and similar types of non-in-ground application sites. The present invention utilizes biochar as substrate and provides a novel biochar composition produced from the thermochemical conversion of biomass feedstock having novel particle size distribution of from about 0.5 mm to about 4 mm. The present invention can be utilized as a greenhouse substrate replacement, for example, and not an in-ground soil amendment as Lee, et al. provides, which is entirely different. Compositions of an in-ground soil amendment composition are completely different from the greenhouse substrate composition of the present invention, as well as the planting conditions that are very different. The biochar composition of the present invention can also replace container substrate components, for example, peat moss or pine bark. Current standard uses of biochar are for field uses to change in-ground soil quality. However, the present invention uses a novel biochar composition as a replacement of greenhouse substrate, for example, to more efficiently grow different types of plants.

A need exists in the field of plant substrate compositions for a novel biochar composition and method of producing such a biochar substrate and of growing plants more efficiently. The present invention provides such a composition and methods.

SUMMARY OF THE INVENTION

The present invention provides a method of making container substrate for plant growth and a method of growing plants in such substrate. The invention utilizes any form of biomass including, but not limited to, woody biomass, such as pine wood and pine bark, and herbaceous crops, such as switchgrass, kenaf, and giant miscanthus, to make biochar through a pyrolysis procedure. Syngas/producer gas (mixture of CO and $H_2$), bio-oil, and biochar are the products of pyrolysis which depends on many factors such as the type of pyrolysis, feedstock, operating conditions, etc. Biomass particles are heated to between 400° C. and 650° C. in the absence of oxygen followed by cooling to condense the pyrolysis product giving bio-oil as the product. Uncondensable pyrolysis product is syngas, while solid residue is biochar. Bio-oil can be burned directly in engines or mixed with diesel oil. Biochar is a fine-grained porous product that effectively removes net carbon dioxide from the atmosphere when it is applied as a container substrate.

The present invention provides methods of using the biochar substrate of the invention to grow plants. The substrate can be used to grow plants in containers, planting beds, or areas on the ground. The substrate of the invention can be used alone to grow plants or can be mixed with other substances to provide a suitable environment for plant growth in containers, in addition to in-ground environments.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages.

DETAILED DESCRIPTION OF THE INVENTION

Figure 1:
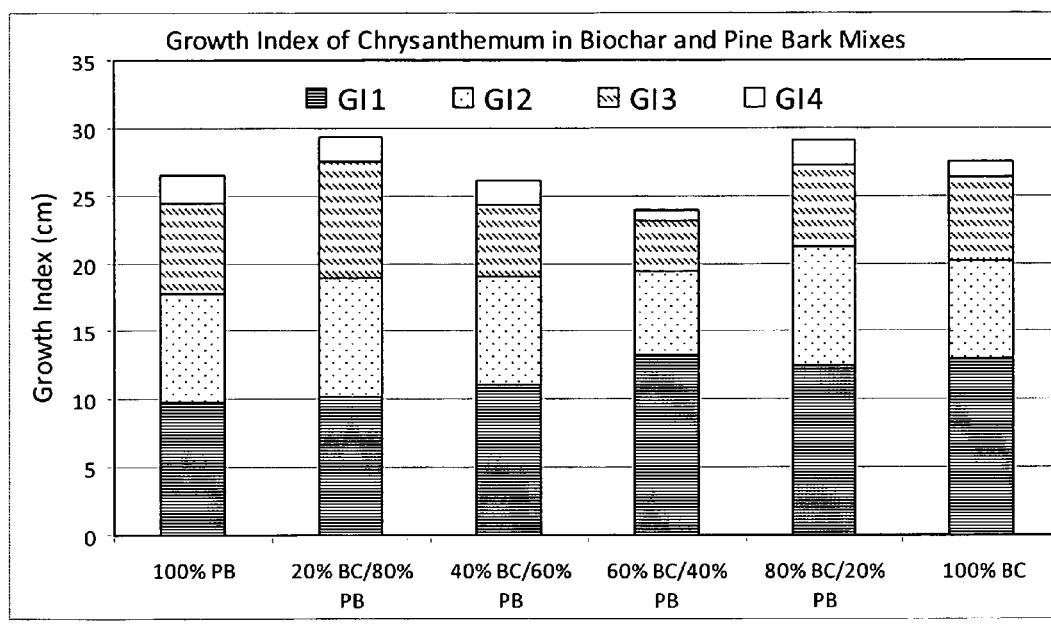
FIG. 1 depicts growth index [GI=(Height+Width+Width)/3] of chrysanthemum grown in six different substrates consisting of biochar (BC) and pine bark (PB) at 30 (GI1), 44 (GI2), 58 (GI3), and 72 (GI4) days after transplanting.

Pyrolysis of biomass feedstocks was conducted at a 2 kg/h feed rate in a proprietary stainless steel auger reactor. Biomass feedstocks such as pinewood powders, switchgrass, etc. were air-dried for 1-2 days to 8-10% moisture content. Each feed was ground in a hammer mill and sieved to a particle size of 2-4 mm prior to pyrolysis. The biomass feedstock size can be from about 0.5 mm to about 4 mm. The auger reactor was compact, did not use a carrier gas or a heat carrier, and operated continuously. The auger reactor pipe was 7.6 cm in diameter and 102 cm in length. The auger speed applied was 12 rpm at a pyrolysis temperature of 450° C. Pyrolysis produced a mixture of bio-oils, gases, and char residues (biochar). Biochar was moved through the reactor by the rotating screw (auger) to a removal pot. The biochar produced during pyrolysis was allowed to cool to ambient temperature before being used as substrate. Biochar of the present invention may be produced by any thermochemical conversion process including, but not limited to, pyrolysis, gasification, torrefaction, or a combination thereof.

Use of Biochar as Container Substrate

As used herein, a container is anything that could be used to hold substrate to grow plants. A container could be a pot, box, bag, bucket, basket, tray, enclosed planting bed, and the likes. As used herein, substrate means a composition of substances in a container where plant materials grow. It refers to any type of materials or combinations of materials that provide a suitable environment for plant growth. "Medium" and "(potting) mix" are two interchangeable terms for "substrate." As used herein, a plant could be a whole plant that includes both root and shoot or a plant material that could develop into a whole plant (for instance, a seed and a cutting).

As discussed above, peat moss harvest is facing environmental critiques and is becoming increasingly expensive for container plant production, and the other substrates are facing competition from the other uses or have various limitations. The present invention provides novel biochar from the pyrolysis process and methods of making a substrate comprising biochar as a suitable, sustainable, and economical alternative to the currently available substrates.

The present invention provides for biochar that can be made in large quantity with uniformity and without shrinkage from organic matter decomposition, from any biomass materials including, but not limited to, wood and wood materials, bark, grasses, and agricultural and industrial byproducts. The inventors have discovered that biochar can act as a suitable substrate for growth and maintenance of container plants, such as greenhouse and nursery crops, which include, but are not limited to, container plants for production or for sale and display in homes and businesses. The plants can be any plant, seed, cutting, or transplant. Unlike peat moss, biochar can be made from byproducts and renewable materials that are fast enough to regenerate. Unlike wood, sawdust, and other straight biomass-based materials, biochar of the invention has undergone a series of high temperature processes, which makes biochar sterile and eliminates any potential shrinkage issue. The unique process of the present invention of making biochar also creates a large surface area for contact with roots and provides for excellent water and nutrient retention capacity.

The substrate of the present invention comprises biochar. The substrate could comprise biochar as the sole component or it could comprise other components in addition to the biochar. Thus, in the enclosed embodiments where the substrate comprises biochar as the sole component, the terms "biochar" and "substrate" are synonymous. The biochar can be composed of one or more species of plant(s) and can be composed of biochars of different sizes and size distributions. Where other components are present in the substrate, the biochar could comprise any percentage of the volume of the substrate with the other substances making up the rest of the volume of the substrate. Such substances may change the chemical or physical properties, or both, of the substrate. Substances that can be included in the substrate include, but are not limited to, fertilizer and components such as nitrogen, carbon, phosphorous, potassium, sulfur, calcium, magnesium, copper, iron, manganese, zinc, boron, molybdenum, aluminum, nickel, water, or a combination of two or more thereof. Such substances may be added before, at the same time, or after the substrate comes in contact with any plant therein. The invention further includes a method of growing a plant or plants comprising contacting at least one plant with a substrate comprising biochar and wherein substance(s) may be added to the substrate to change the chemical and/or physical properties of the substrate and wherein the substance(s) is(are) added before, at the same time, or after the substrate comes in contact with at least one plant, and harvesting food and/or flowers from the plant(s). The plant(s) can be a plant, seed, cutting, or transplant.

The present invention provides a novel biochar that is suitable for plant growth. Although in many embodiments, biochar comprises the main, major, and predominant component (≥50% by volume) of the substrate, in certain embodiments biochar of the present invention could be used as an amendment to the substrate (<50% by volume). For the purpose of this disclosure, where biochar is present in an amount of equal to or greater than 50% by volume, biochar is considered the main component of the substrate and where biochar is present in an amount of less than 50% by volume, it is considered an amendment to the substrate. The novel biochar of the present invention is a suitable, sustainable, and economical alternative to peat moss and substrates comprising peat and other components typically used in container plants. Biochar of the present invention can be used as a substitute for perlite, vermiculite, wood chips, and/or pine bark (among many other things), which are typically added to peat moss to improve its physical properties including water drainage and aeration. A substrate using the novel biochar can be composed of from 0% to 100% by volume of the novel biochar and can be used with any type of plant. A substrate comprising the biochar of the present invention could typically be comprised of at least 50% biochar, by volume, with the remaining amount, by volume, comprised of other materials including, but not limited to, bark or other non-wood parts of a plant or plants.

As mentioned above, biochar according to the present invention is not composted, does not need to be composted, and does not shrink in volume due to decomposition. No volume shrinkage needs to be considered when biochar of the invention is used for any container plants with long or short production cycle. Moreover, the process of making biochar of the current invention also kills pathogens, weed seeds, insects, and other organisms harmful to plants. Thus, pasteurization is not necessary for the present invention.

Further processing of the substrate of the present invention could include adding substances commonly seen in the plant industry or other industries. Examples of substances that could be incorporated with the biochar of the present invention include, but are not limited to, wetting agents, fertilizers, colorants, antifungal agents, pre-emergent herbicides, mycorrhizal fungi, and water.

EXAMPLE 1

Physical Properties of Biochar

TABLE 1

Physical properties of biochar compared to commonly-used substrate or substrate components.

| Substrates | Total porosity (%) | Container Capacity | Air space | Bulk Density (g/cc) |
| --- | --- | --- | --- | --- |
| Sunshine #1 Mix | 77.5 | 57.8 | 19.7 | 0.092 |
| Peat moss | 83.3 | 64.4 | 18.9 | 0.081 |
| Bark | 78.8 | 47.4 | 31.4 | 0.150 |
| Biochar | 82.9 | 48.6 | 34.2 | 0.174 |

EXAMPLE 2

Use of Biochar to Grow Potted Plants

Biochar was investigated as potting substrate on greenhouse-grown chrysanthemum, tomato, lettuce, and basil. However, other plants including gomphrena are also ideal plants for growing in the biochar of the present invention. Potting mixes were mixed according to Table 2. Lime rate used for bark was 1.8 kg/m$^3$ according to a previous study.

Four (4) g/pot of fertilizer Osmocote 15-9-2 was applied on Oct. 22, 2010. Substances that can be included in the biochar processing include, but are not limited to, fertilizer and components such as nitrogen, carbon, phosphorous, potassium, sulfur, calcium, magnesium, copper, iron, manganese, zinc, boron, molybdenum, aluminum, nickel, water, or a combination of two or more thereof. Such substances may change the chemical or physical properties, or both, of the substrate.

Basil seeds were sowed in 7*14 plug trays on Aug. 19, 2010 and potted up in 6-inch azalea pots on Sep. 16, 2010. Lettuce and tomato seeds were sowed in 7*14 plug trays on Sep. 20, 2010 and potted up in 6-inch azalea pots on Oct. 13, 2010. Chrysanthemum cuttings were cut from fresh plant and rooted in 7*14 plug trays on Aug. 11, 2010 and were transplanted in 6-inch azalea pots on Sep. 20, 2010.

Growth index [GI=(Height+Width+Width)/3] of chrysanthemum was measured 30 DAP, 44 DAP, 58 DAP, and 72 DAP [DAP=days after planting]. Number of flowers and percentage of flowering were recorded before harvesting at 73 DAP. Fresh weight (FW) and dry weight (DW) were measured after harvesting (74 DAP).

For tomato, GI was measured 5 DAP, 19 DAP, 33 DAP, and 47 DAP. The pH and EC [EC=electrical conductivity] were measured by pour through method 16 DAP, 30 DAP, and 44 DAP. Number of fruit was recorded before harvesting at 44 DAP. FW and DW were measured after harvesting (45 DAP).

For lettuce, GI was measured 5 DAP, 19 DAP, and 33 DAP. The pH and EC were measured 16 DAP and 30 DAP. FW was measured after harvesting at 34 DAP. There was a repeated trial of lettuce. The second trial of lettuce was sown on Nov. 1, 2010 and potted up in 6-inch azalea pots on Dec. 2, 2010. Only fresh weight was recorded for the second trial on Jan. 2, 2011.

Basil was shortened to three nodes on Sep. 30, 2010. They were harvested when needed by cutting to one node from Oct. 20, 2010 to Nov. 30, 2010. FW and DW of each harvest were measured and total yield were calculated.

TABLE 2

The component of 12 potting mixes.

| Potting mixes | char % (vol.) | Bark % (vol.) | Sunshine % (vol.) |
| --- | --- | --- | --- |
| 1 | 0 | 100 | 0 |
| 2 | 20 | 80 | 0 |
| 3 | 40 | 60 | 0 |
| 4 | 60 | 40 | 0 |
| 5 | 80 | 20 | 0 |
| 6 | 100 | 0 | 0 |
| 7 | 0 | 0 | 100 |
| 8 | 20 | 0 | 80 |
| 9 | 40 | 0 | 60 |
| 10 | 60 | 0 | 40 |
| 11 | 80 | 0 | 20 |
| 12 | 100 | 0 | 0 |

Figure 2:
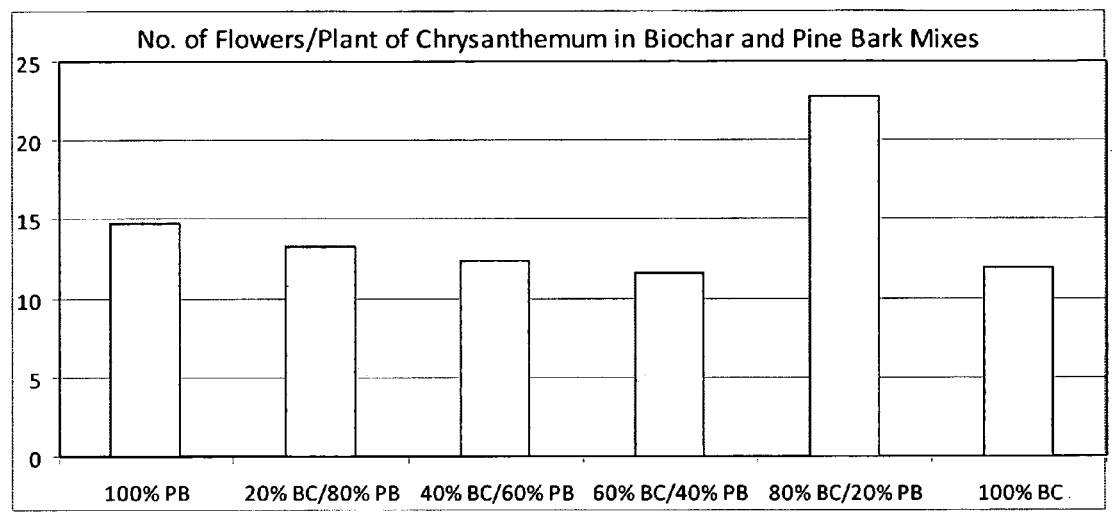
FIG. 2 depicts the number of flowers per plant of chrysanthemum grown in six different substrates consisting of biochar (BC) and pine bark (PB) at 73 days after transplanting.
Figure 3:
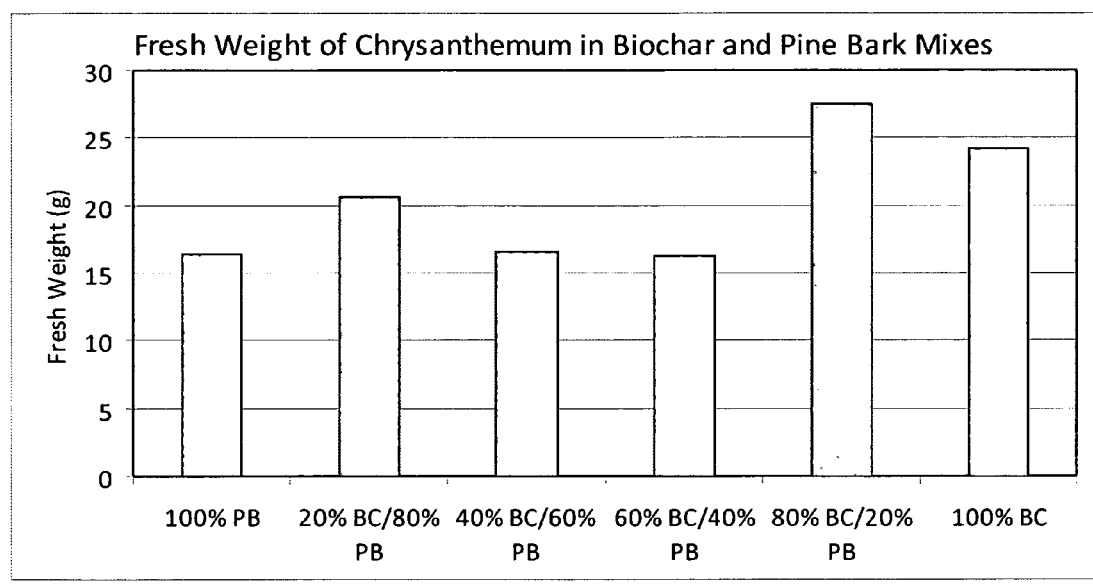
FIG. 3 depicts the fresh weight per plant of chrysanthemum grown in six different substrates consisting of biochar (BC) and pine bark (PB) at 74 days after transplanting.
Figure 4:
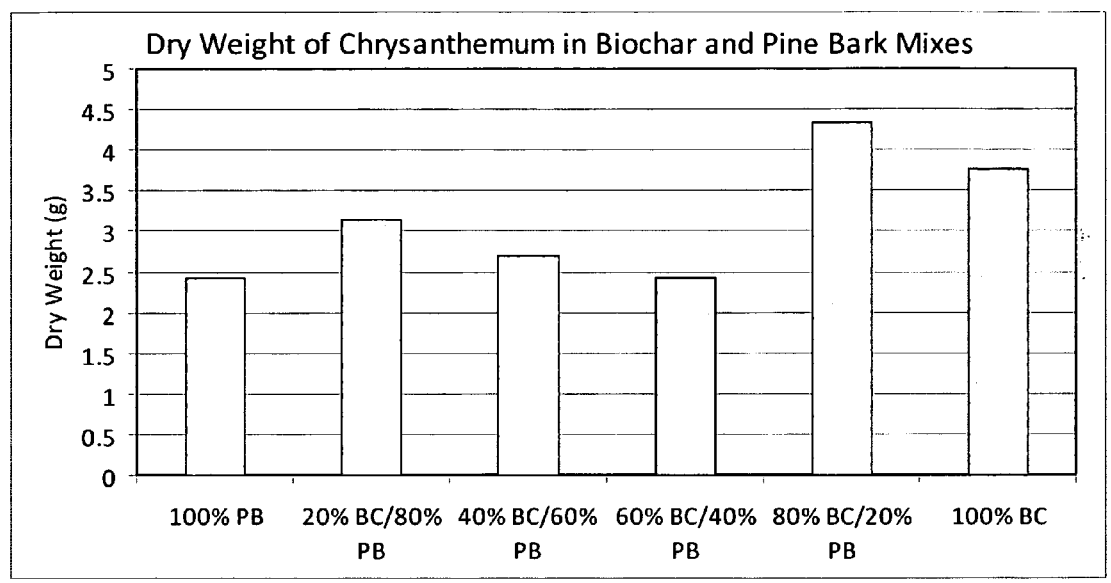
FIG. 4 depicts the dry weight per plant of chrysanthemum grown in six different substrates consisting of biochar (BC) and pine bark (PB) at 74 days after transplanting.

For Chrysanthemum:

Compared to 100% PB, GI of chrysanthemum was not significantly higher or lower when BC was blended in the potting mix at 20%, 40%, 60%, 80%, or 100% ratio (FIG. 1). The number of flowers was similar for all mixes except 80% BC/20% PB (FIG. 2). None of the fresh weight and dry weight of chrysanthemum plants grown in potting mixes with BC was lower than that of plants grown in 100% PB (FIGS. 3 & 4).

Figure 5:
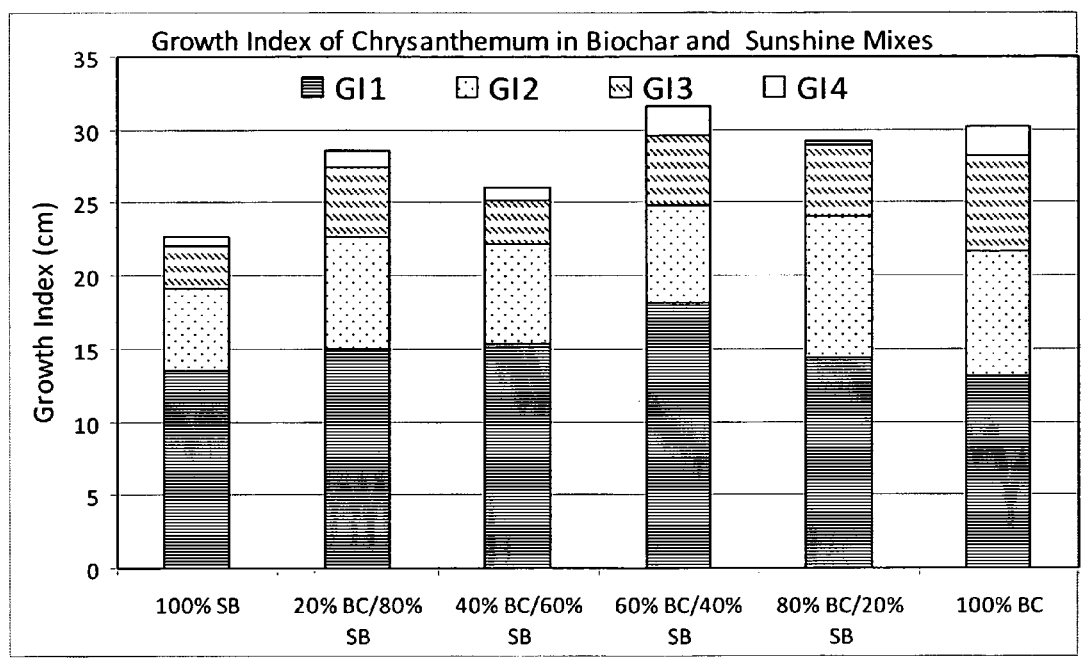
FIG. 5 depicts growth index [GI=(Height+Width+Width)/3] of chrysanthemum grown in six different substrates consisting of biochar (BC) and Sunshine Mix #1 (SB) at 30 (GI1), 44 (GI2), 58 (GI3), and 72 (GI4) days after transplanting.
Figure 6:
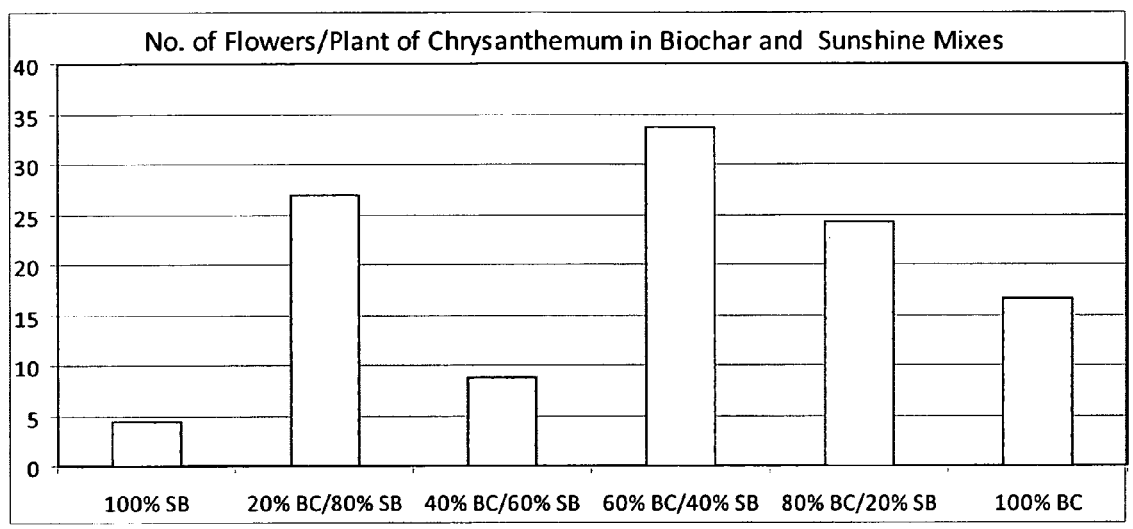
FIG. 6 depicts the number of flowers per plant of chrysanthemum grown in six different substrates consisting of biochar (BC) and Sunshine Mix #1 (SB) at 73 days after transplanting.
Figure 7:
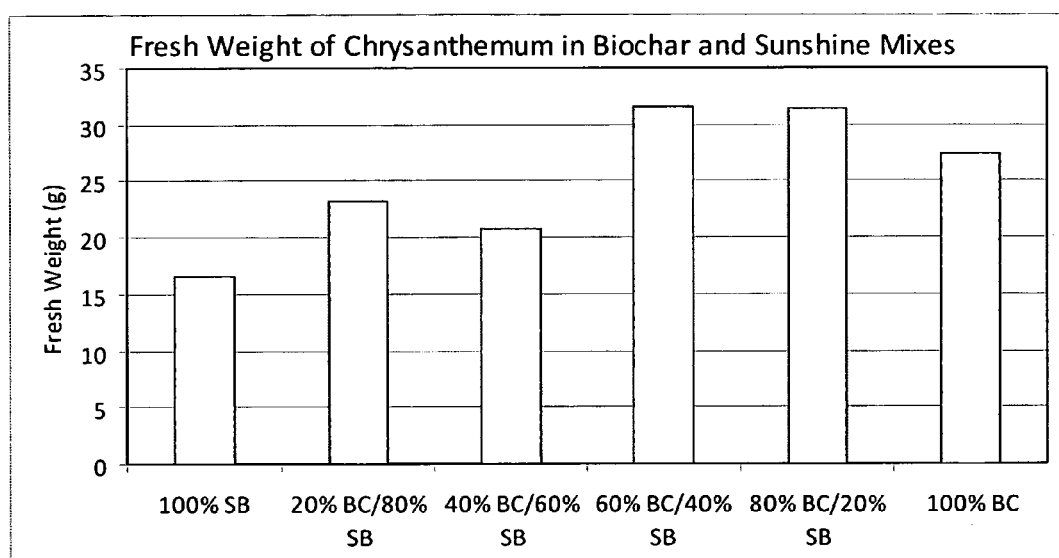
FIG. 7 depicts the fresh weight per plant of chrysanthemum grown in six different substrates consisting of biochar (BC) and Sunshine Mix #1 (SB) at 74 days after transplanting.
Figure 8:
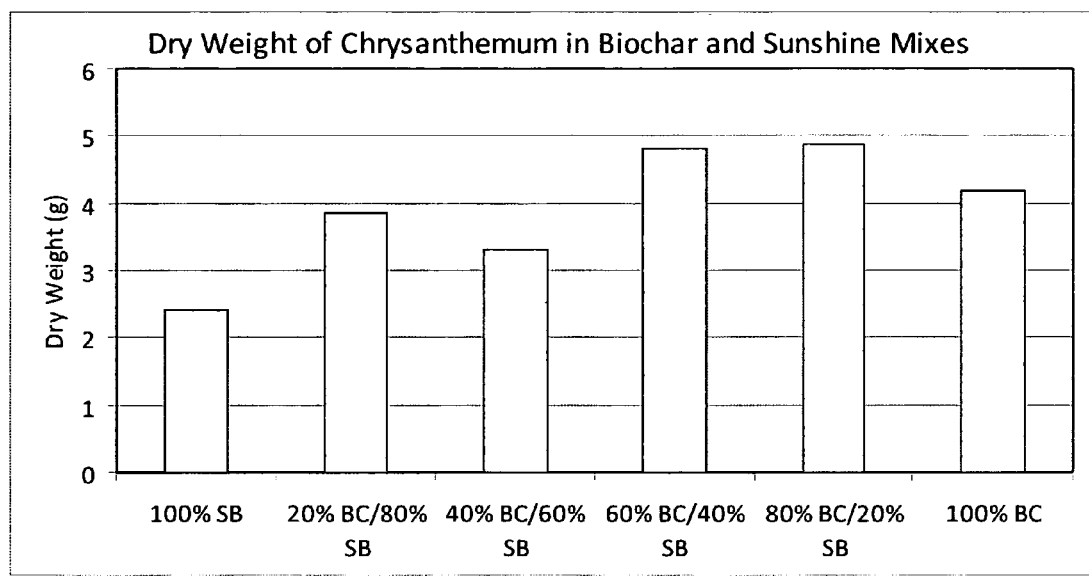
FIG. 8 depicts the dry weight per plant of chrysanthemum grown in six different substrates consisting of biochar (BC) and Sunshine Mix #1 (SB) at 74 days after transplanting.

GI of chrysanthemum plants was higher for all mixes with BC than 100% SB, (FIG. 5). Plants grown in mixes with BC had more flowers than 100% SB (FIG. 6) and their fresh weight and dry weight were higher than those grown in 100% SB (FIGS. 7 & 8).

Figure 9:
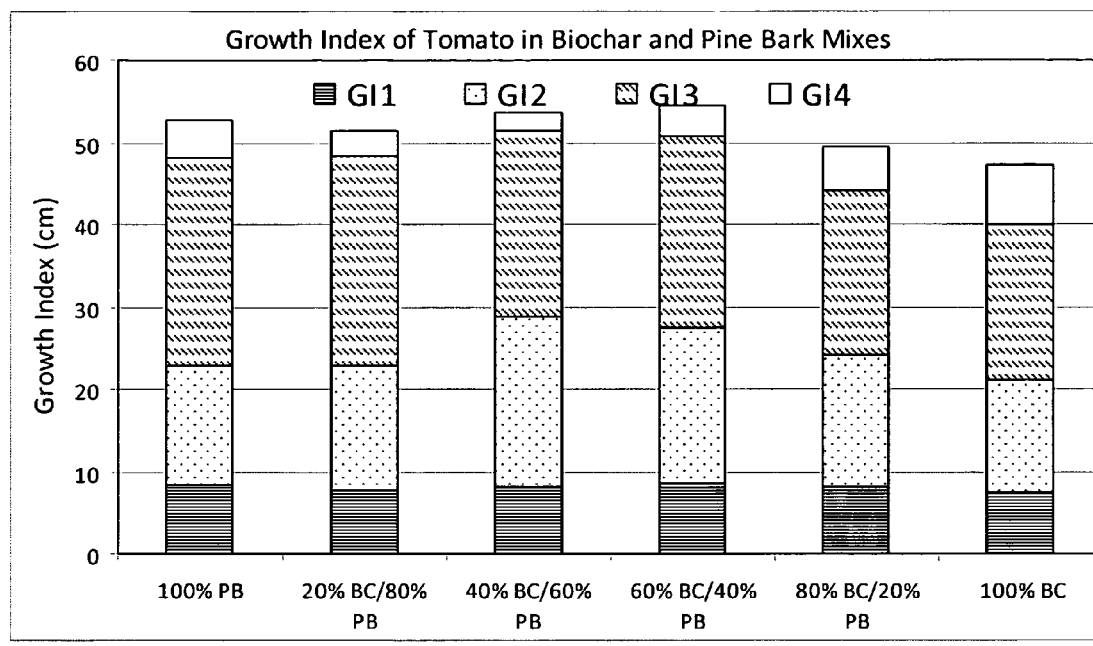
FIG. 9 depicts growth index [GI=(Height+Width+Width)/3] of tomato grown in six different substrates consisting of biochar (BC) and pine bark (PB) at 5 (GI1), 19 (GI2), 33 (GI3), and 47 (GI4) days after transplanting.
Figure 10:
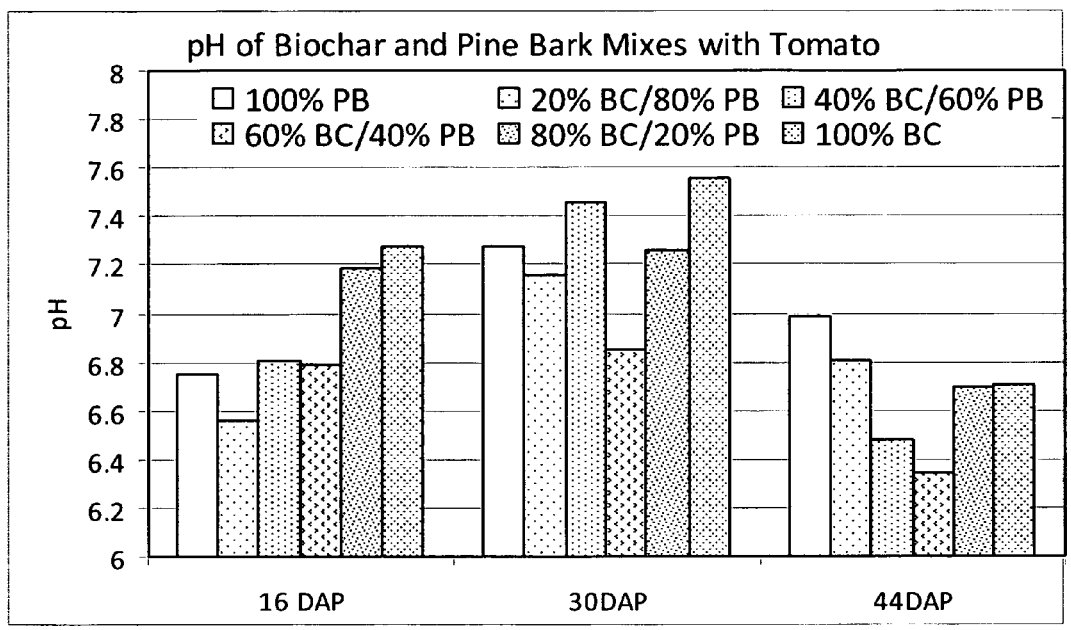
FIG. 10 depicts substrate pH of tomato grown in six different substrates consisting of biochar (BC) and pine bark (PB) at 16, 30, and 44 days after transplanting.
Figure 11:
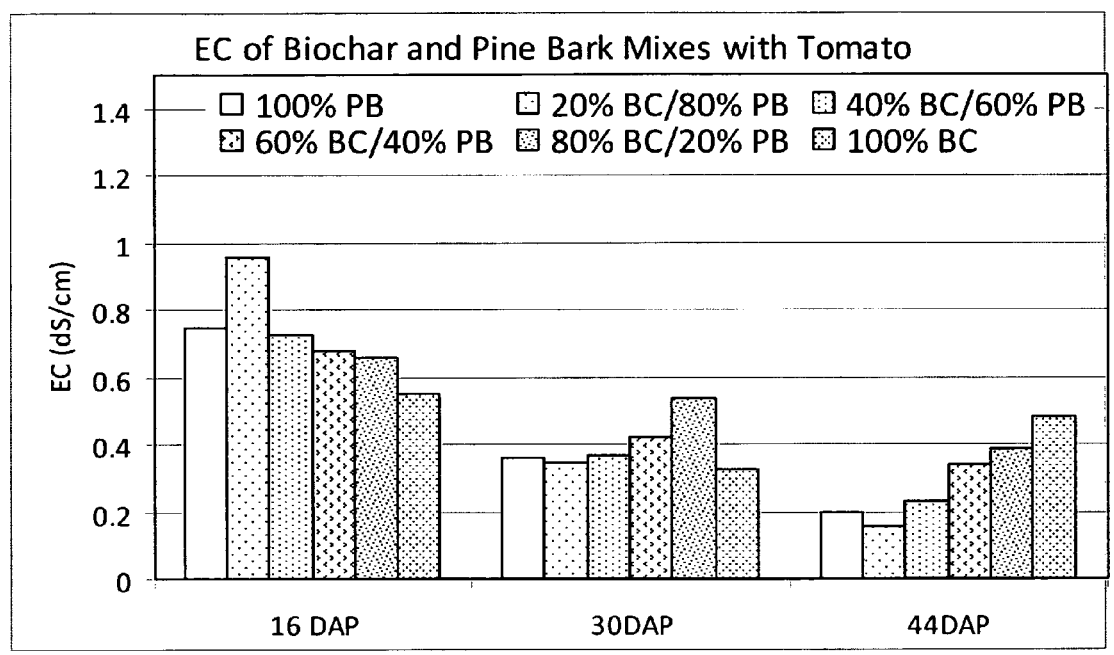
FIG. 11 depicts substrate EC of tomato grown in six different substrates consisting of biochar (BC) and pine bark (PB) at 16, 30, and 44 days after transplanting.
Figure 12:
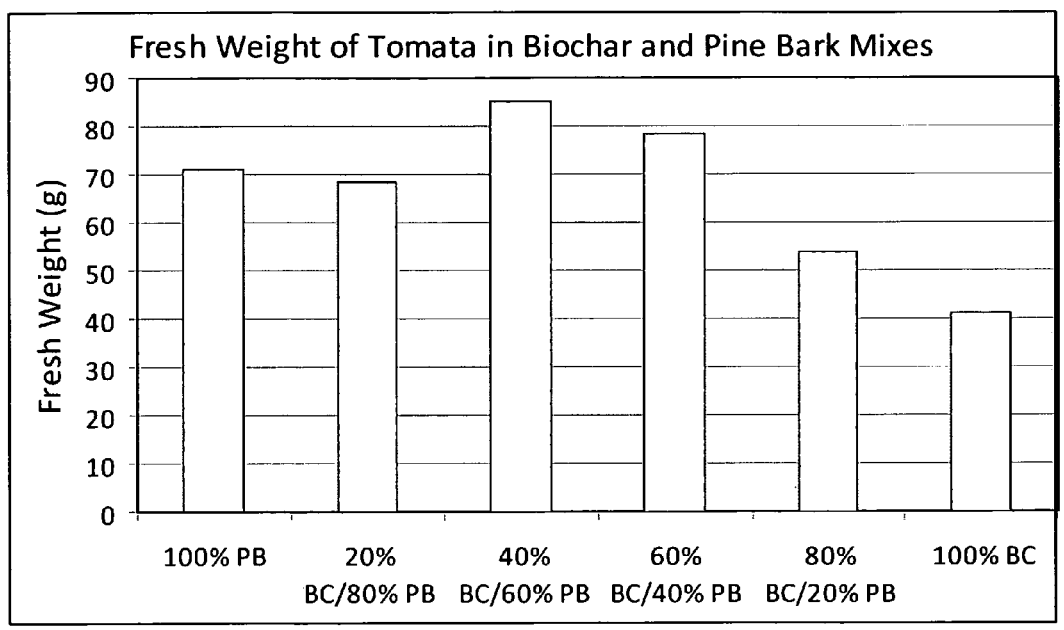
FIG. 12 depicts fresh weight of tomato plant grown in six different substrates consisting of biochar (BC) and pine bark (PB) at 45 days after transplanting.
Figure 13:
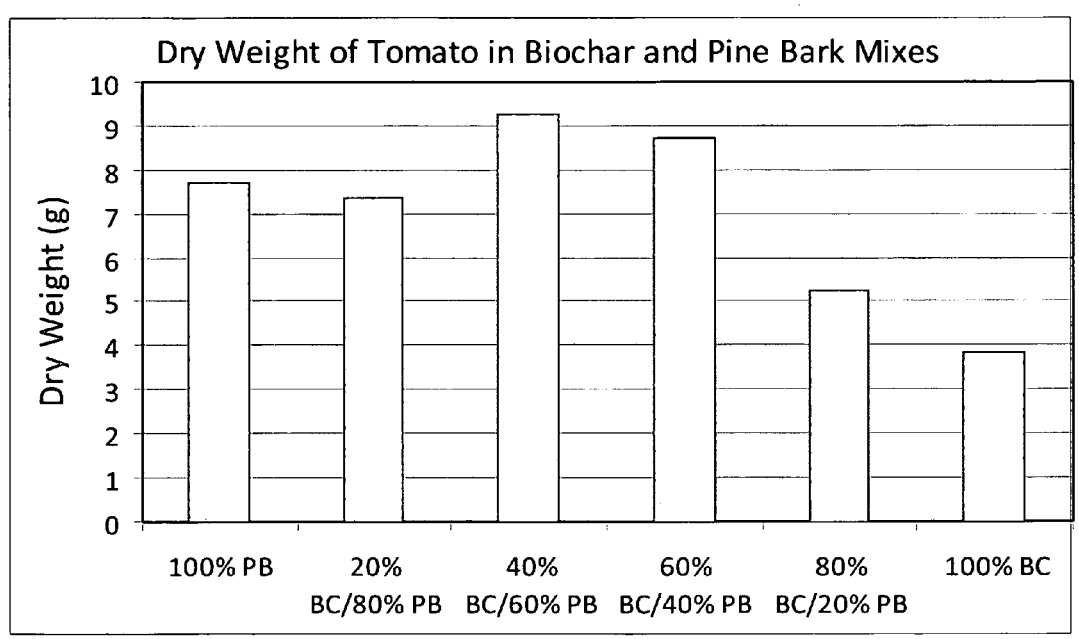
FIG. 13 depicts dry weight of tomato plant grown in six different substrates consisting of biochar (BC) and pine bark (PB) at 45 days after transplanting.

For Tomato:

In BC/PB mixes, plants grown 20%, 80%, and 100% BC had only slightly lower GI than plants in 100% PB, and plants in 40% and 60% BC had slightly higher GI than those in 100% PB (FIG. 9). The pH of mixes with BC may be higher than 100% PB on 16 days after planting (DAP), but was lower than 100% PB on 44 DAP (FIG. 10). EC of BC/PB mixes was similar at 16 DAP and 30 DAP, but EC of potting mixes was generally higher with higher percentage of BC in the potting mixes on 44 DAP (FIG. 11). Plants grown in mixes with up to 60% BC had similar or higher fresh weight and dry weight than 100% PB (FIGS. 12 & 13).

Figure 14:
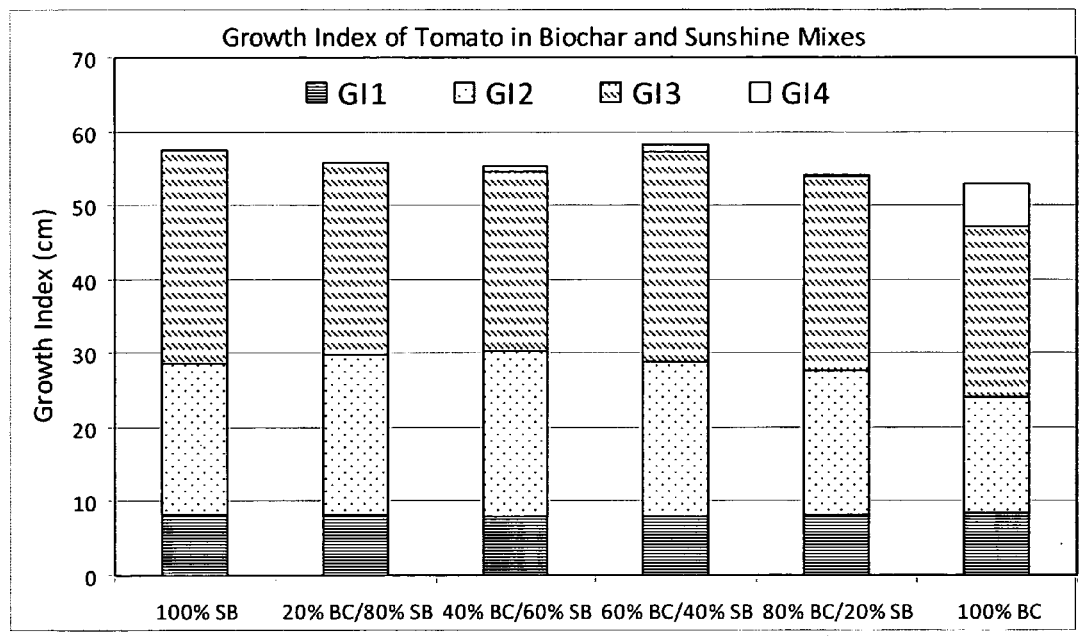
FIG. 14 depicts growth index [GI=(Height+Width+Width)/3] of tomato grown in six different substrates consisting of biochar (BC) and Sunshine Mix #1 (SB) at 5 (GI1), 19 (GI2), 33 (GI3), and 47 (GI4) days after transplanting.
Figure 15:
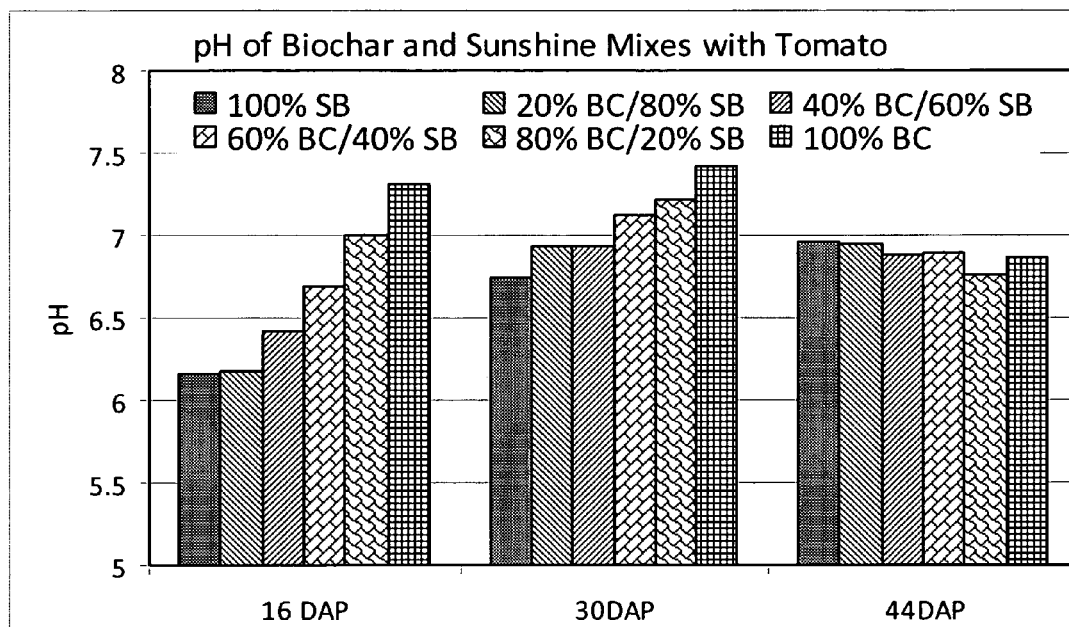
FIG. 15 depicts substrate pH of tomato grown in six different substrates consisting of biochar (BC) and Sunshine Mix #1 (SB) at 16, 30, and 44 days after transplanting.
Figure 16:
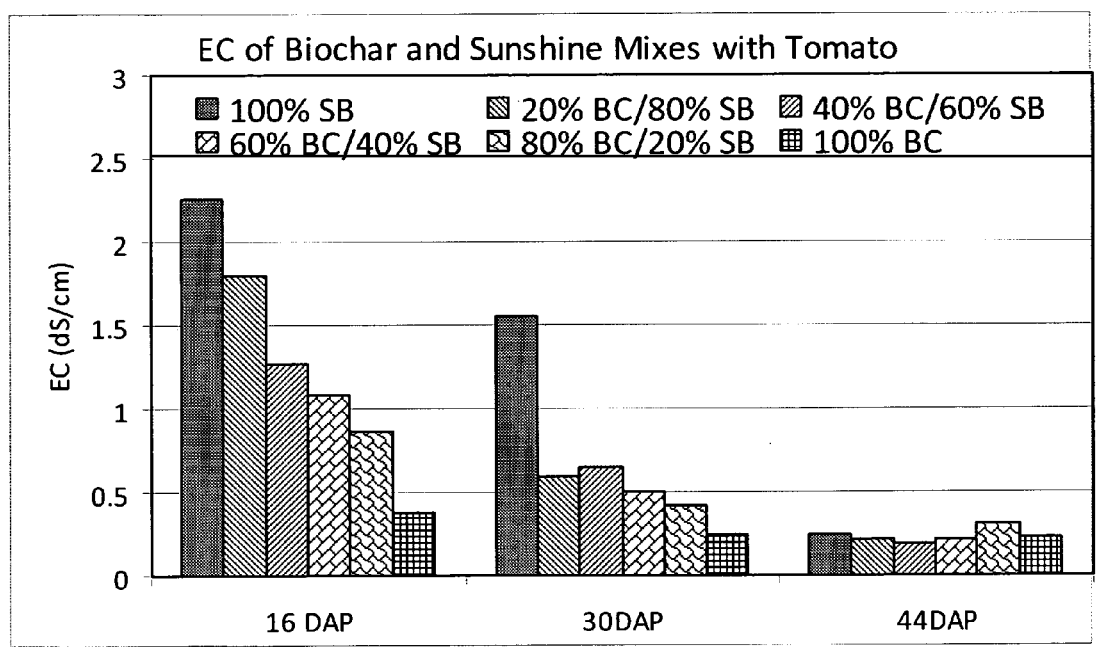
FIG. 16 depicts substrate EC of tomato grown in six different substrates consisting of biochar (BC) and Sunshine Mix #1 (SB) at 16, 30, and 44 days after transplanting.
Figure 17:
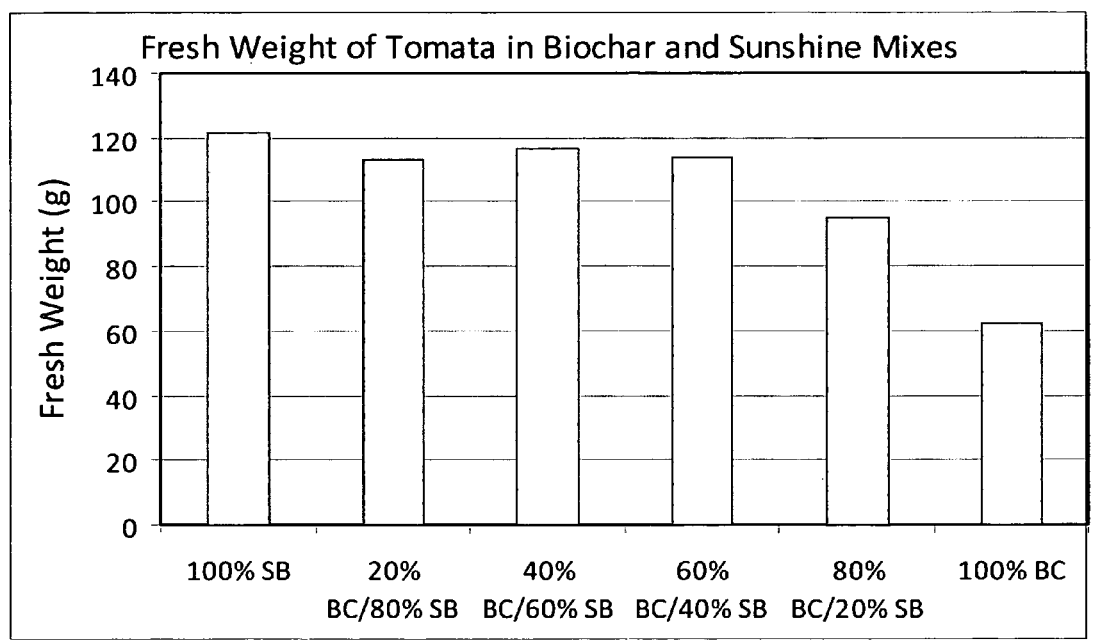
FIG. 17 depicts fresh weight of tomato plant grown in six different substrates consisting of biochar (BC) and Sunshine Mix #1 (SB) at 45 days after transplanting.
Figure 18:
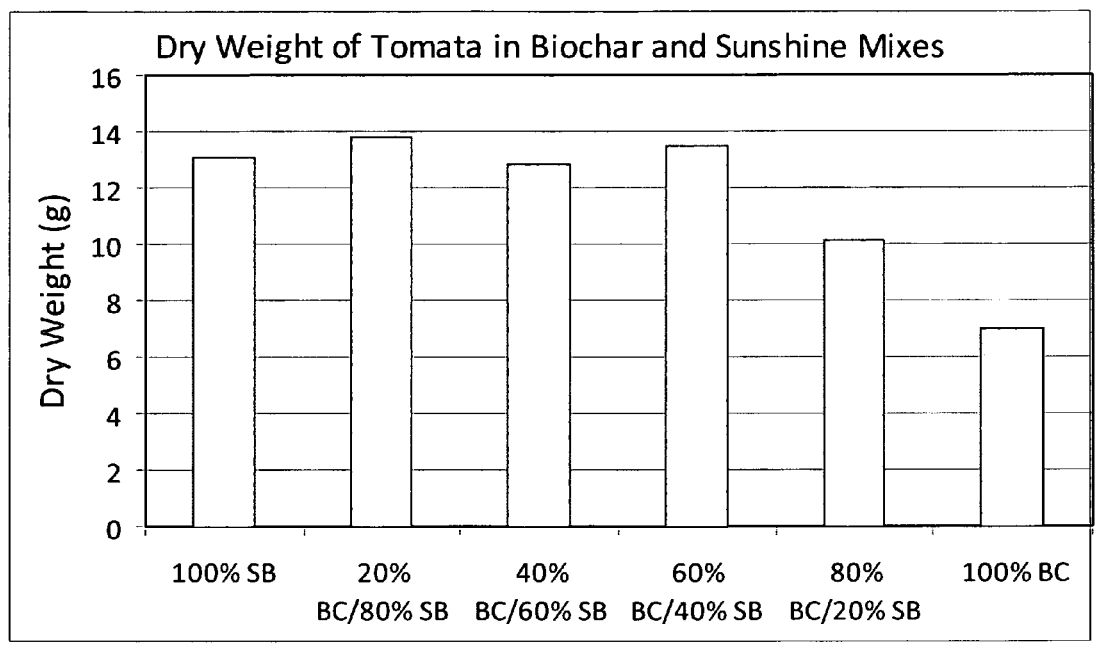
FIG. 18 depicts dry weight of tomato plant grown in six different substrates consisting of biochar (BC) and Sunshine Mix #1 (SB) at 45 days after transplanting.

In BC/SB mixes, GI of plants grown in mixes with BC was similar to that of plants in 100% SB (FIG. 14). The pH of mixes with BC was higher than that of 100% SB on 16 DAP and 30 DAP, but was similar to 100% SB on 44 DAP (FIG. 15). EC of mixes with BC was lower than 100% SB at 16 DAP and 30 DAP, but was similar to 100% SB on 44 DAP (FIG. 16). Plants grown in mixes with up to 60% BC had similar or higher fresh weight and dry weight than 100% SB (FIGS. 17 & 18).

Figure 19:
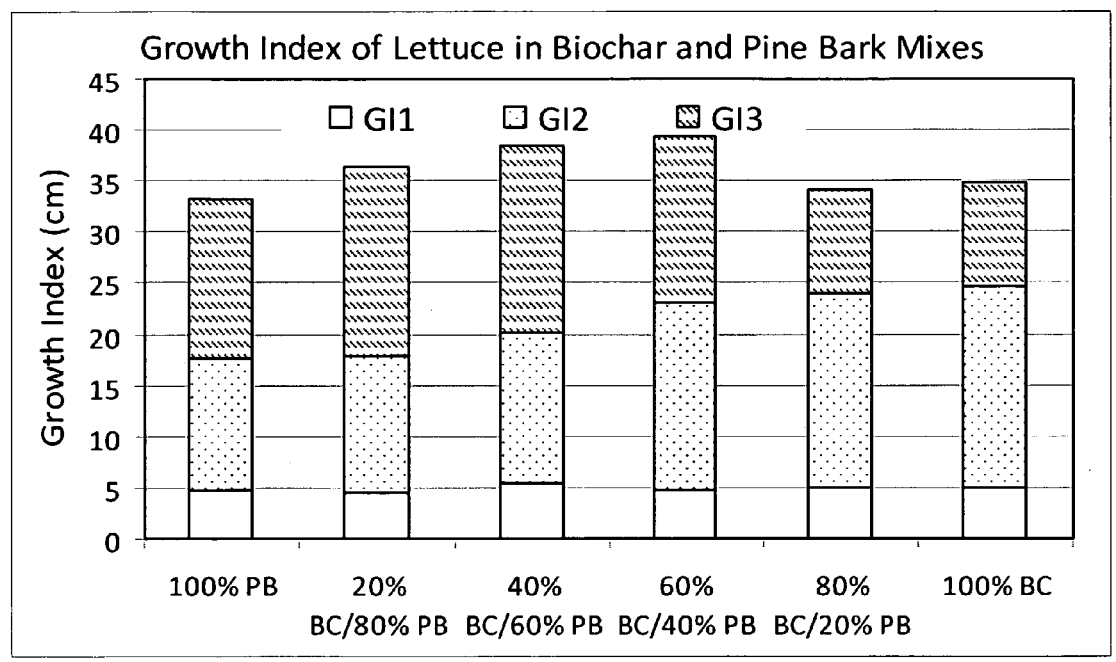
FIG. 19 depicts growth index [GI=(Height+Width+Width)/3] of lettuce grown in six different substrates consisting of biochar (BC) and pine bark (PB) at 5 (GI1), 19 (GI2), and 33 (GI3) days after transplanting.
Figure 20:
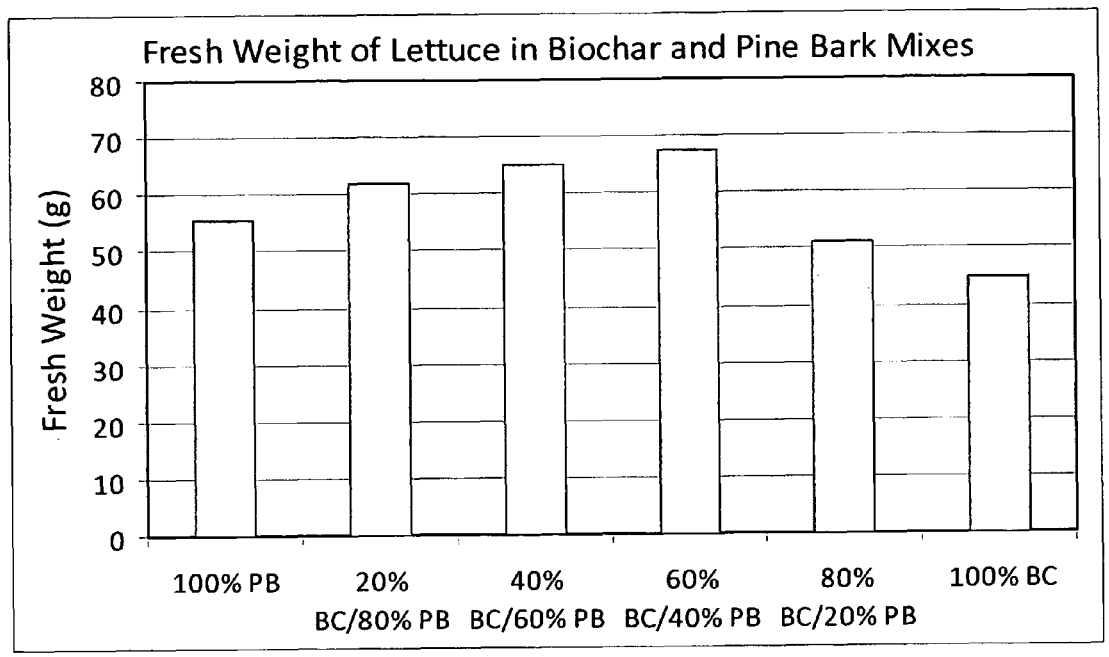
FIG. 20 depicts fresh weight of lettuce plant grown in six different substrates consisting of biochar (BC) and pine bark (PB) at 34 days after transplanting.

For Lettuce:

In BC/PB mixes, none of the GI of plants grown in mixes with BC was lower than that of plants in 100% PB (FIG. 19), and plants grown in mixes with up to 60% BC had higher fresh weight than 100% PB (FIG. 20).

Figure 21:
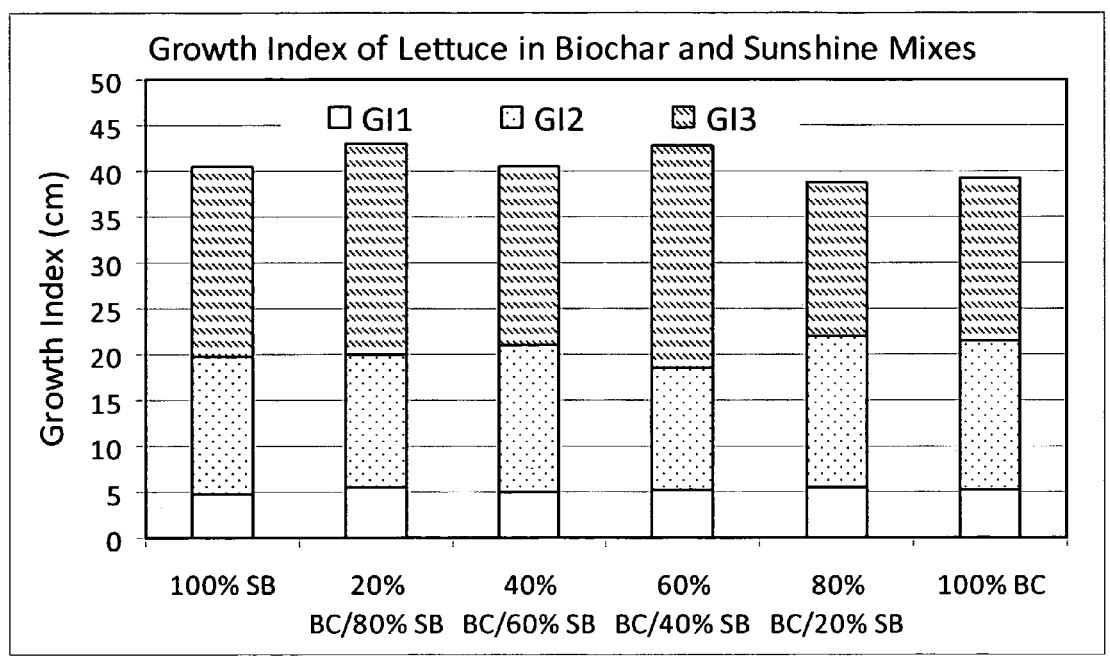
FIG. 21 depicts growth index [GI=(Height+Width+Width)/3] of lettuce grown in six different substrates consisting of biochar (BC) and Sunshine Mix #1 (SB) at 5 (GI1), 19 (GI2), and 33 (GI3) days after transplanting.
Figure 22:
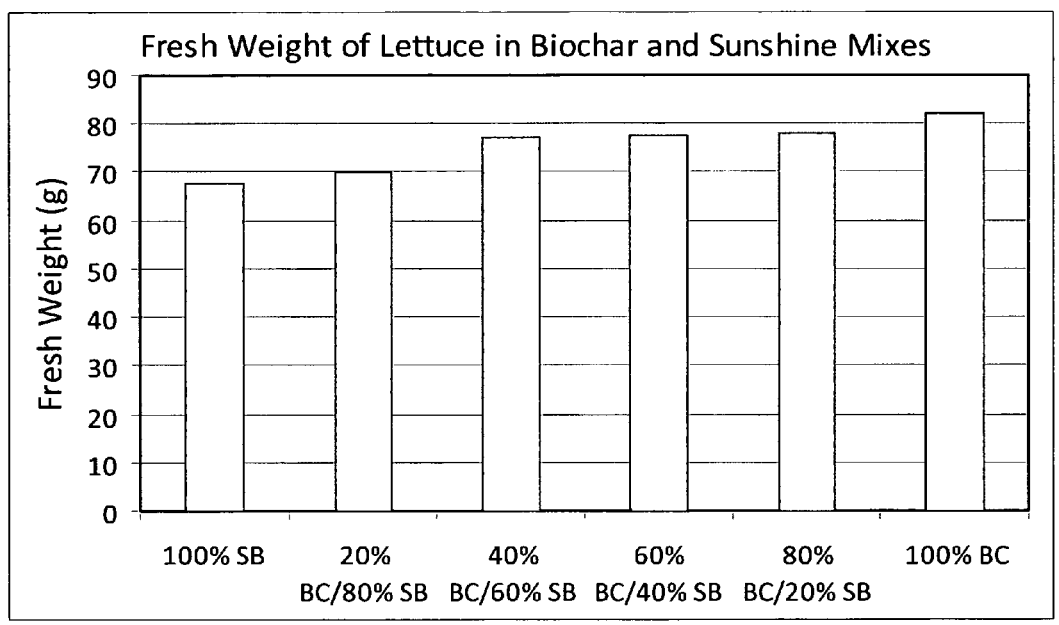
FIG. 22 depicts fresh weight of lettuce plant grown in six different substrates consisting of biochar (BC) and Sunshine Mix #1 (SB) at 34 days after transplanting.

In BC/SB mixes, GI of plants grown in mixes with BC was similar to that of plants in 100% SB (FIG. 21), and plants grown in mixes with BC had higher fresh weight than 100% SB (FIG. 22).

Figure 23:
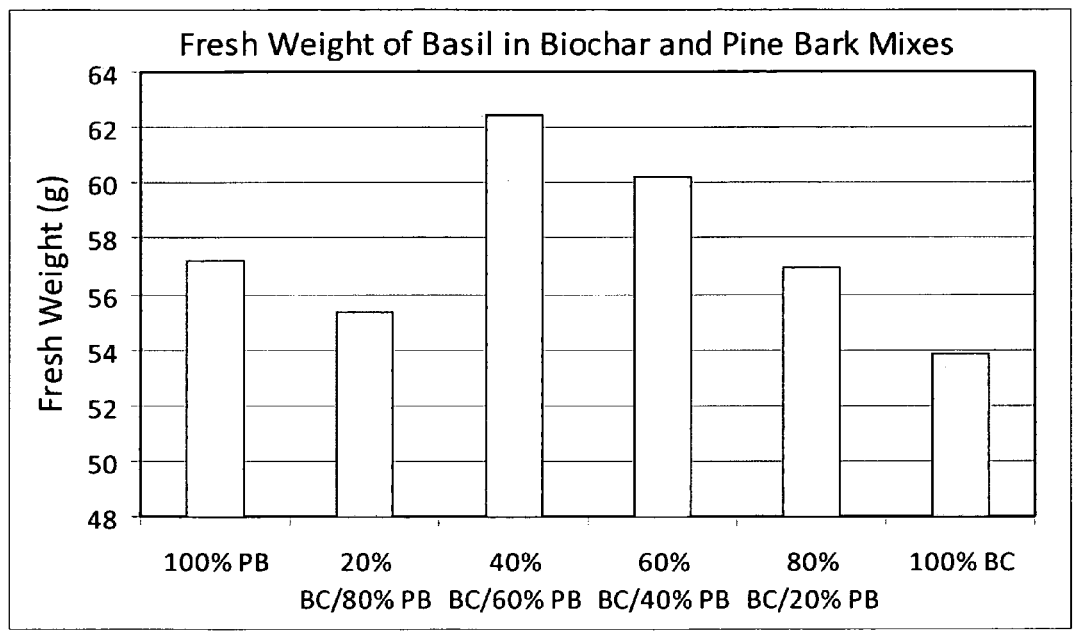
FIG. 23 depicts fresh weight of basil harvested within a month from plant grown in six different substrates consisting of biochar (BC) and pine bark (PB).
Figure 24:
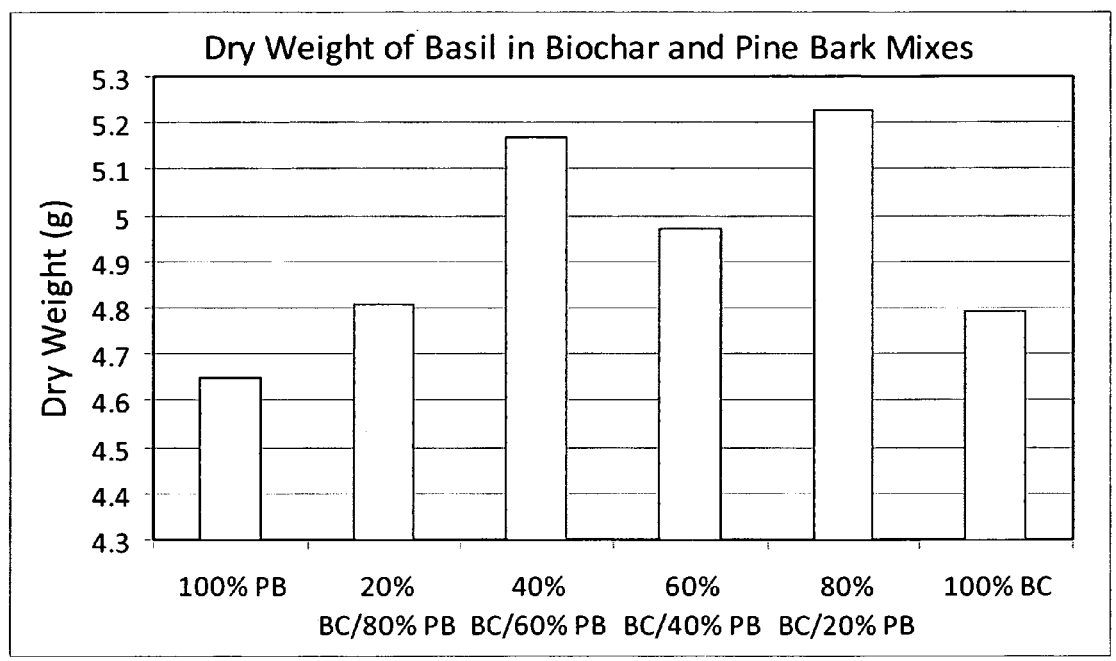
FIG. 24 depicts dry weight of basil harvested within a month from plant grown in six different substrates consisting of biochar (BC) and pine bark (PB).

For Basil:

In BC/PB mixes, fresh and dry weight of plants grown in mixes with BC was similar or higher than that of plants in 100% PB (FIGS. 23 & 24).

Figure 25:
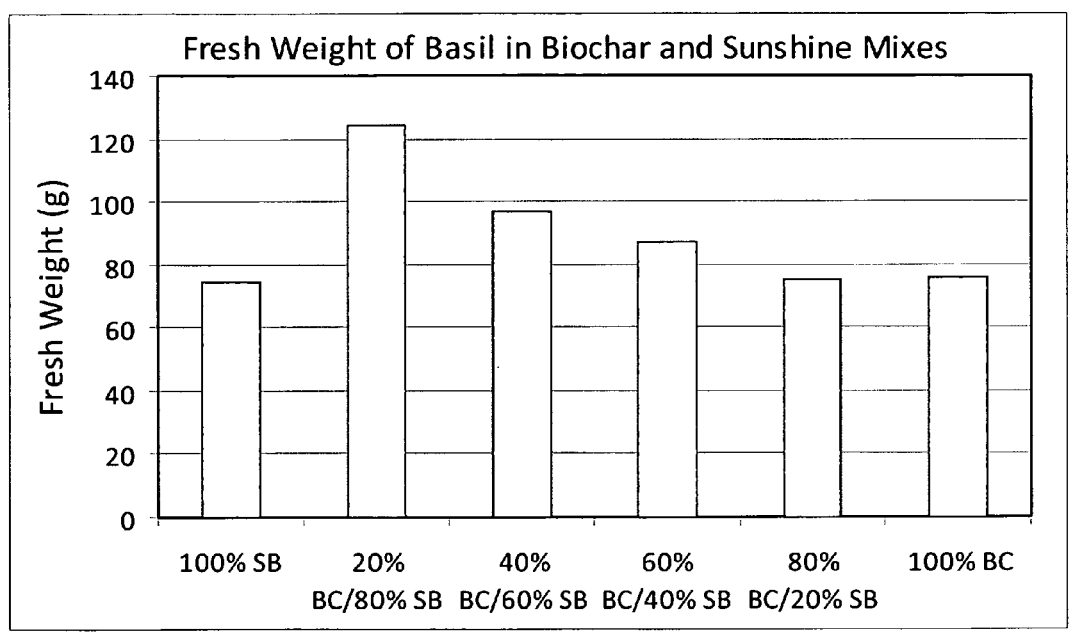
FIG. 25 depicts fresh weight of basil harvested within a month from plant grown in six different substrates consisting of biochar (BC) and Sunshine Mix #1 (SB).
Figure 26:
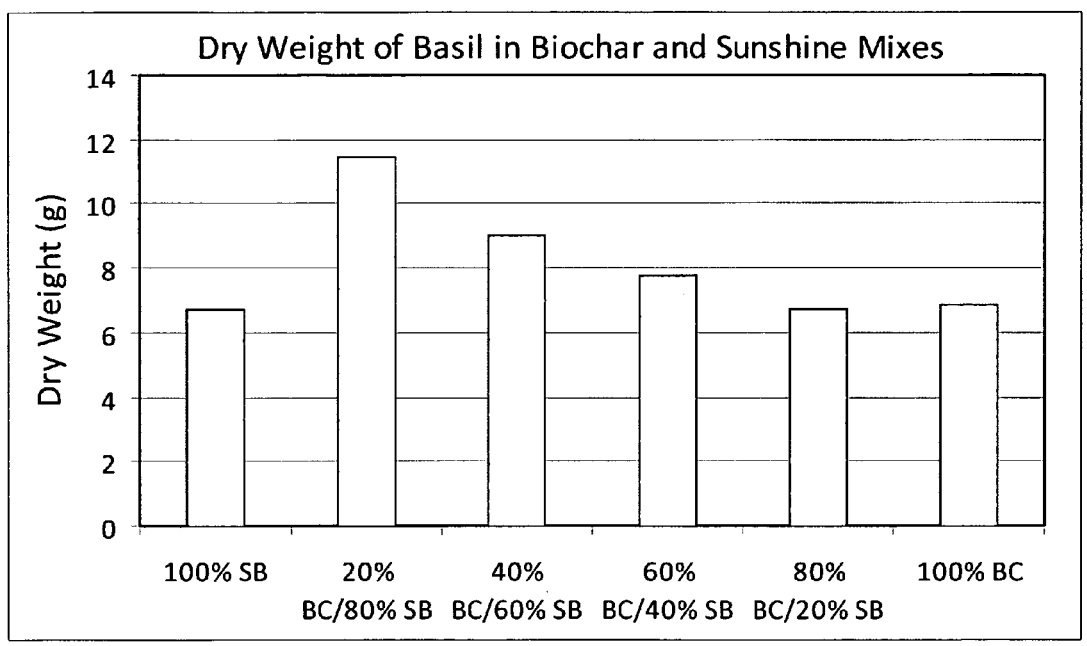
FIG. 26 depicts dry weight of basil harvested within a month from plant grown in six different substrates consisting of biochar (BC) and Sunshine Mix #1 (SB).

In BC/SB mixes, fresh and dry weight of plants grown in mixes with BC was similar or higher than that of plants in 100% SB (FIGS. 25 & 26).

The invention has for the first time provided for novel biochar compositions and a method for producing a novel substrate for growing plants in a container utilizing biomass from at least one plant where the biomass is processed to make the novel biochar composition for plant growth, as well as a method for growing various plants using a substrate comprising the novel biochar composition. The present invention utilizes the new biochar composition in containers as high value growing substrate (potting mixes), where the container is a pot, box, bag, bucket, basket, tray, enclosed planting bed, and other similar types of application sites. The biochar of the invention can be utilized as a greenhouse substrate replacement, for one example, and can replace peat moss or pine bark to more efficiently grow different types of plants.

The above detailed description is presented to enable any person skilled in the art to make and use the invention. Specific details have been revealed to provide a comprehensive understanding of the present invention, and are used for explanation of the information provided. These specific details, however, are not required to practice the invention, as is apparent to one skilled in the art. Descriptions of specific applications, analyses, and/or calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

The compositions, methods, and system of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

REFERENCES

U.S. Patent Documents

Lee, J. W., Buchanan III, A. C., Evans, B. R., and Kidder, M. K. Enhancing cation-exchange capacity of biochar for soil amendment and global carbon sequestration. U.S. patent application Ser. No. 12/686,831, filed Jan. 13, 2010.

REFERENCES

Non-Patent Documents

1. Wright, R. D. and J. F. Browder. 2005. Chipped pine logs: A potential substrate for greenhouse and nursery crops. HortScience 40:1513-1515.
2. Robertson, R. A. 1993. Peat, horticulture and environment. Biodiversity Conserv. 2:541-547.
3. Glenn B. Fain, Charles H. Gilliam, Jeff L. Sibley, and Cheryl R. Boyer. 2008. WholeTree substrates derived from three species of pine in production of annual vinca. HortTechnology 18: 13-17.
4. Robert D. Wright, Brian E. Jackson, Jake F. Browder, and Joyce G. Latimer. 2008. Growth of chrysanthemum in a pine tree substrate requires additional fertilizer. HortTechnology 18: 111-115.
5. Cheryl R. Boyer, Glenn B. Fain, Charles H. Gilliam, Thomas V. Gallagher, H. Allen Torbert, and Jeff L. Sibley. 2008. Clean chip residual: A substrate component for growing annuals. HortTechnology 18: 423-432.
6. Altland, J. E., Frantz, J. 2009. Use of Switchgrass as the Primary Potting Component in Nursery Containers. Hortscience Proceedings. 44:1130.
7. Maria Papafotiou, Barbara Avajianneli, Costas Michos, and Iordanis Chatzipavlidis. 2007. Coloration, anthocyanin concentration, and growth of croton (*Codiaeum variegatum* L.) as affected by cotton gin trash compost use in the potting medium. HortScience 42: 83-87.
8. Mitchell W. Goyne and Michael A. Arnold. 1996. Container production of underutilized urban trees using kenaf and coconut coir pith. HortScience 31: 753-754.
9. Michele Krucker, Rita L. Hummel, and Craig Cogger. 2010. Chrysanthemum Production in Composted and Non-composted Organic Waste Substrates Fertilized with Nitrogen at Two Rates Using Surface and Subirrigation. HortScience 45: 1695-1701.

What is claimed is:

1. Biochar made from a thermochemical conversion of biomass feedstock having a size of from about 0.5 mm to about 4 mm, wherein the biochar has a porosity of about 83 percent and an air space of about 34 percent and the biomass feedstock comprises woody biomass, herbaceous crops, or a combination thereof.

2. The biochar of embodiment 1, wherein the woody biomass is selected from the group consisting of pine wood, pine bark, or a combination thereof.

3. The biochar of embodiment 1, wherein the herbaceous crops is selected from the group consisting of switchgrass, kenaf, giant miscanthus, or a combination thereof.

4. The biochar of embodiment 1, wherein the thermochemical conversion is by pyrolysis.

5. A substrate for growing plants comprising the biochar of embodiment 1.

6. The substrate of embodiment 5, wherein the biochar comprises from more than 0% to 100% of the substrate by volume.

7. The substrate of embodiment 5, wherein the plant grown is any species of plant or any type of plant material.

8. The substrate of embodiment 5, wherein the biochar is from a single species of plant.

9. The substrate of embodiment 5, wherein the biochar is from at least two species of plants.

10. The substrate of embodiment 5, wherein at least from about 60% to about 99.5% of the substrate, by volume, comprises biochar.

11. The substrate of embodiment 5, further comprising at least one substance that changes the chemical properties, the physical properties, or both, of the substrate.

12. The substrate of embodiment 11, wherein the at least one substance is nitrogen, carbon, phosphorous, potassium, sulfur, calcium, magnesium, copper, iron, manganese, zinc, boron, molybdenum, aluminum, nickel, water, or a combination of two or more thereof.

13. The substrate of embodiment 11, wherein the at least one substance is a colorant.

14. A method of making a substrate for growing plants in a container, the method comprising:
   providing biomass from at least one plant; and
   processing the biomass to produce a first biochar suitable for use as a component of the substrate for plant growth, wherein the first biochar is made from a thermochemical conversion of biomass feedstock having a size of from about 0.5 mm to about 4 mm, and wherein the first biochar has a porosity of about 83 percent and an air space of about 34 percent and the biomass feedstock comprises woody biomass, herbaceous crops, or a combination thereof.

15. The method of embodiment 14, wherein the first biochar is from one species of plant.

16. The method of embodiment 14, further comprising processing the first biochar by a thermochemical conversion process of pyrolysis.

17. The method of embodiment 16, wherein processing the first biochar comprises packaging the first biochar.

18. The method of embodiment 16, wherein processing the first biochar comprises adding at least one substance to the first biochar that changes the chemical properties, the physical properties, or both, of the substrate.

19. The method of embodiment 18, wherein the at least one substance is nitrogen, carbon, phosphorous, potassium, sulfur, calcium, magnesium, copper, iron, manganese, zinc, boron, molybdenum, aluminum, nickel, water, or a combination of two or more thereof.

20. The method of embodiment 16, wherein processing the first biochar comprises mixing the first biochar made from one species of plant with at least one biochar made from a different species of plant.

21. The method of embodiment 16, wherein processing the first biochar comprises mixing the first biochar having a specific size and size distribution with at least one biochar having a different size and size distribution from the first biochar.

22. A method of growing a plant, the method comprising:
providing at least one plant; and
contacting the at least one plant with a substrate comprising a biochar, wherein the biochar is made from a thermochemical conversion of biomass feedstock having a size of from about 0.5 mm to about 4 mm, and wherein the biochar has a porosity of about 83 percent and an air space of about 34 percent and the biomass feedstock comprises woody biomass, herbaceous crops, or a combination thereof.

23. The method of embodiment 22, further comprising adding at least one substance to the substrate that changes the chemical properties, the physical properties, or both, of the substrate, wherein the at least one substance is added before, at the same time, or after the substrate comes in contact with the at least one plant.

24. The method of embodiment 22, wherein the at least one plant is a seed, cutting, or transplant.

25. The method of embodiment 22, wherein the at least one plant is a lettuce, a basil, a tomato, a chrysanthemum, or a gomphrena.

26. The method of embodiment 22, further comprising harvesting food, flowers, or both, from the at least one plant.

* * * * *